United States Patent [19]
Summach

[11] Patent Number: 5,913,006
[45] Date of Patent: Jun. 15, 1999

| [54] | FIBRE SLACK STORAGE RETRACTABLE PANEL AND INTERFACE |
|---|---|
| [75] | Inventor: Harley Robert William Summach, Ashton, Canada |
| [73] | Assignee: Northern Telecom Limited, Montreal, Canada |
| [21] | Appl. No.: 08/978,475 |
| [22] | Filed: Nov. 25, 1997 |
| [51] | Int. Cl.[6] .................................................. G02B 6/00 |
| [52] | U.S. Cl. ......................... 385/134; 385/135; 385/147 |
| [58] | Field of Search ................................... 385/134, 135, 385/147 |

[56] References Cited

U.S. PATENT DOCUMENTS

| 4,770,357 | 9/1988 | Sander et al. .......................... 242/54 R |
|---|---|---|
| 4,776,662 | 10/1988 | Valleix ..................................... 350/134 |
| 4,824,196 | 4/1989 | Bylander ................................. 385/135 |
| 5,013,112 | 5/1991 | Hellwig .................................. 350/134 |
| 5,138,688 | 8/1992 | Debortoli ................................ 385/135 |
| 5,268,986 | 12/1993 | Kakii ....................................... 385/135 |
| 5,339,379 | 8/1994 | Kutsch .................................... 385/135 |
| 5,412,497 | 5/1995 | Kaetsu et al. ........................... 359/163 |
| 5,640,481 | 6/1997 | Llewellyn et al. ...................... 385/134 |
| 5,715,348 | 2/1998 | Falkenberg et al. .................... 385/135 |

FOREIGN PATENT DOCUMENTS

2241221 8/1991 United Kingdom ................... 385/135

Primary Examiner—John D. Lee
Assistant Examiner—Victoria D. Hao

[57] ABSTRACT

A panel for managing fibres to be routed to an equipment bay, where the panel has a closed position, allowing limited or no access to the fibres, and an open position, allowing access to the fibres. The panel has a movable spool for maintaining approximately a constant amount of slack in the fibres as the panel moves from the open position to the closed position or from the closed position to the open position.

18 Claims, 14 Drawing Sheets

FIG. 6b

FIBRE SLACK STORAGE RETRACTABLE PANEL AND INTERFACE

FIELD OF THE INVENTION

The invention relates to panels for storing fibre and is particularly concerned with a retractable panel for storing slack fibre to be routed to an equipment bay.

BACKGROUND OF THE INVENTION

Equipment bays often consist of one or more shelves, each shelf having one or more circuit boards vertically aligned, for example. Typically, each circuit board (or other components within the equipment bay) require a connection to one or more optical or electrical fibres. Since the fibres may need to be serviced from time to time or because one fibre may have to be rerouted from one circuit board to another, it is usual to have from one to four meters of slack for each fibre. If there is a large number of fibres, a technique for managing the slack for all the fibres is desirable to allow easy access to any particular fibre, to avoid tangling and to maintain a minimum curvature of the fibres to avoid damaging the fibres.

However, since space is often at a premium around equipment bays, it is desirable to manage the slack to avoid tangles or bending of the fibres beyond a minimum curvature while, at the same time, allowing easy access to the fibres in a limited amount of space.

A number of devices are known which overcome some of the above-noted concerns. For example, U.S. Pat. No. 5,339,379, (inventor: Kutsch) which issued on Aug. 16, 1994 and U.S. Pat. No. 4,824,196 (inventor: Bylander) which issued on Apr. 25, 1989 both describe a series of trays for managing slack fibre. However, each tray described in the Kutsch patent only accommodates a single fibre and each tray in the Bylander patent only accommodates, at most, 12 fibres. For ease of fibre management, it is desirable to be able to see all the fibres in the storage panel at once. As well, the need for a potentially large number of trays in the Kutsch and Bylander patents creates the prospect of a complicated array of trays which could lead to significant logistical problems. Further, it seems unlikely that either of the Kutsch or Bylander devices could effectively accommodate from one to four meters of slack from a significant number of fibres.

U.S. Pat. No. 5,268,986 (inventor: Kakii) which issued on Dec. 7, 1993 and U.K. patent application 2,241,221 (inventor: Cloutman) which was published on Aug. 28, 1991, each describe devices for managing slack of a single fibre. These patents do not describe devices allowing for easy access to a potentially large number of fibres in a limited amount of space.

SUMMARY OF THE INVENTION

It is an object of the invention is to obviate or mitigate one or more of the above identified disadvantages.

According to a first broad aspect, the invention provides a panel for managing fibres to be routed to an equipment bay, the panel being arranged to slide parallel to an end of the equipment bay between a closed position in which the panel is adjacent to the end of the equipment bay, allowing limited or no access to the fibres, and an open position in which the panel is displaced from the end of the equipment bay, allowing access to the fibres, wherein the panel is provided with spools for supporting the fibres and fibre guides for guiding the fibres, one of the spools being a movable spool which moves vertically in one direction as the panel moves from the closed position to the open position and moves vertically in the other direction as the panel moves from the open position to the closed position, thereby maintaining approximately a constant amount of slack in the fibres as the panel moves from the open position to the closed position or from the closed position to the open position.

According to another broad aspect, the invention provides an equipment bay having an end from which optical or electrical fibres are routed to the equipment bay, the equipment bay being provided with a panel for managing the fibres, the panel having a closed position in which the panel is adjacent the end of the equipment bay allowing limited or no access to the fibres, and an open position in which the panel is displaced from the end of the equipment bay, allowing access to the fibres, wherein the panel is provided with spools for supporting the fibres and fibre guides for guiding the fibres, one of the spools being a movable spool which moves vertically in one direction as the panel moves from the closed position to the open position and moves vertically in the other direction as the panel moves from the open position to the closed position, thereby maintaining approximately a constant amount of slack in the fibres as the panel moves from the open position to the closed position or from the closed position to the open position.

Advantages of the present invention include a means for managing slack fibre in a relatively limited space, while at the same time allowing access to the fibres for maintenance or rerouting of the fibres without unbundling the existing fibres.

BRIEF DESCRIPTION OF THE DRAWINGS

Preferred embodiments of the invention will now be described with reference to the attached drawings in which

FIG. 2a is a front view of a spool;

FIG. 2b is a side view of the spool of FIG. 2a;

FIG. 2c is a perspective view of six spools, showing another possible shape of spools;

FIG. 6b is a magnified view of a portion of FIG. 6a.

DETAILED DESCRIPTION OF THE PREFERRED EMBODIMENTS

Figure 1A:
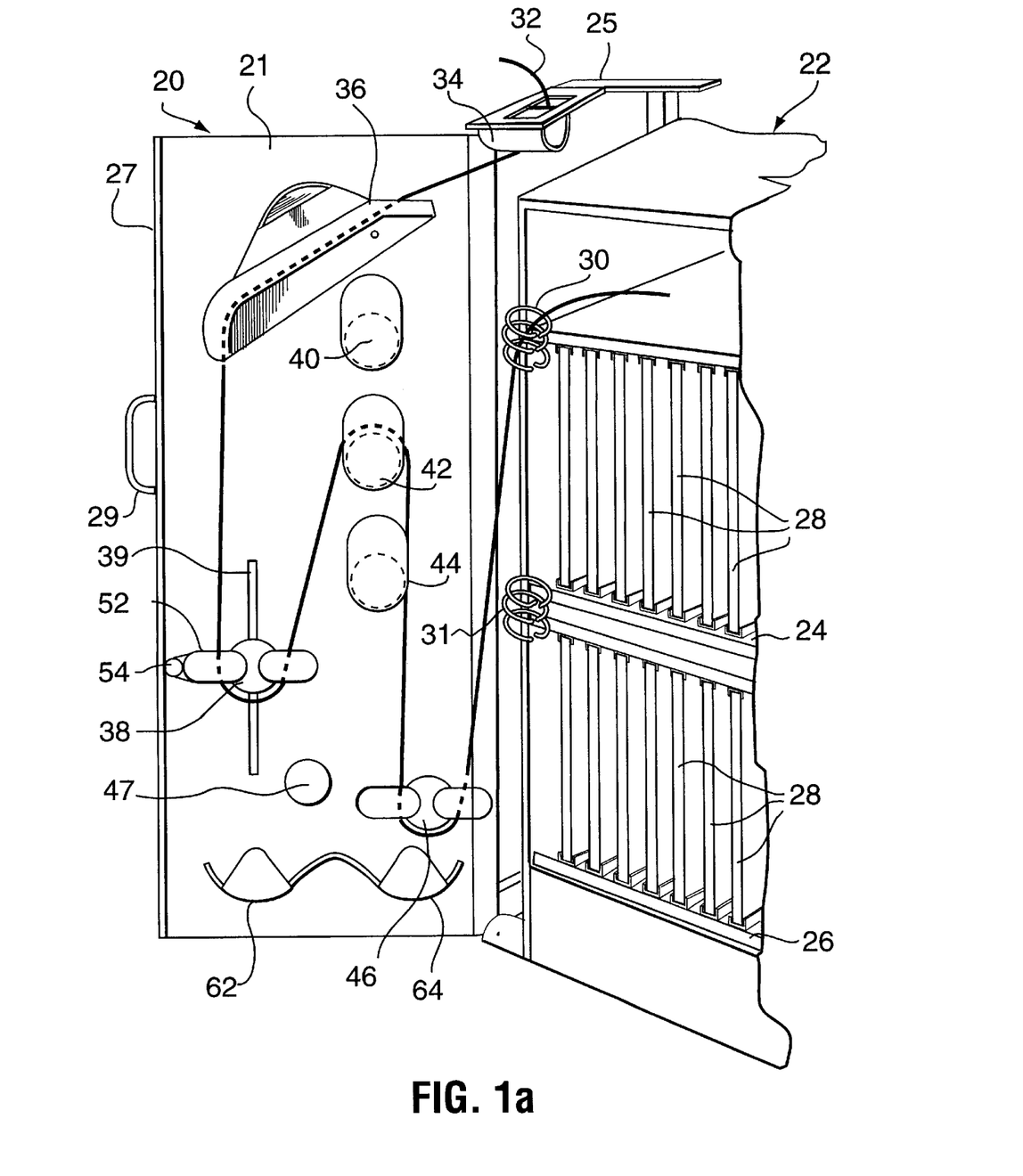
FIG. 1a is a front view of a retractable slack fibre panel, in an open position, adjacent an equipment bay, showing a single fibre entering from above the panel, according to one embodiment of the invention.

FIG. 1a shows a front view of a retractable slack fibre panel 20, in an open position, adjacent an equipment bay 22, which equipment bay is typically a metal unit housing electrical components. The equipment bay 22, in this example, has two shelves 24, 26, each shelf holding a number of vertically aligned circuit boards 28. However, the equipment bay 22 could hold any type of components requiring attachments to fibres. The equipment bay 22 also has fibre guides 30, 31 through or along which fibre from the panel 20 travels.

Figure 3A:
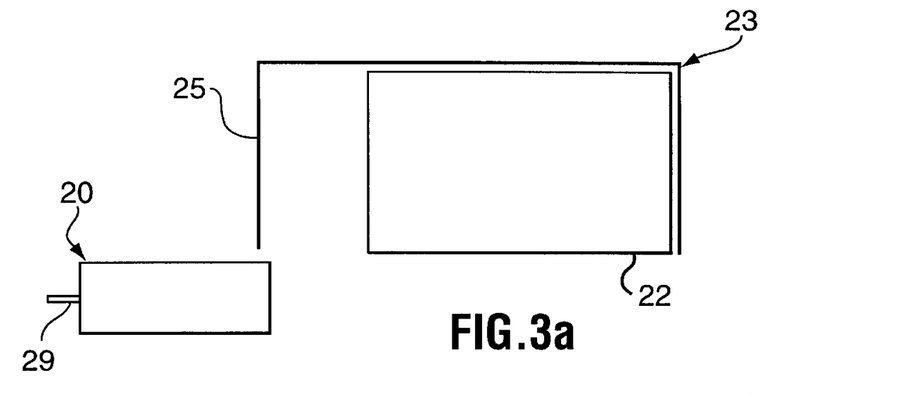
FIGS. 3a–3c are top views of the panel adjacent the equipment bay with the panel in the open position, mid-way open position, and closed position, respectively.
Figure 3B:
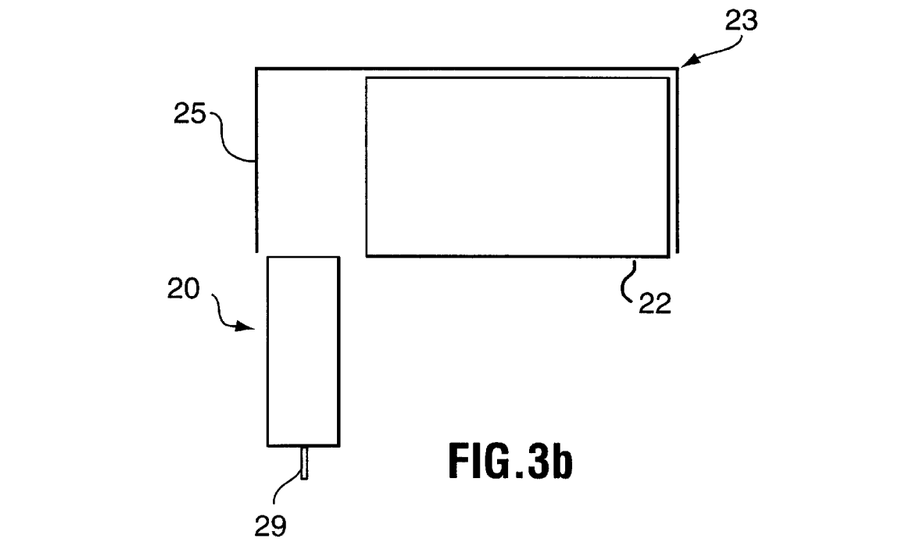
Figure 3C:
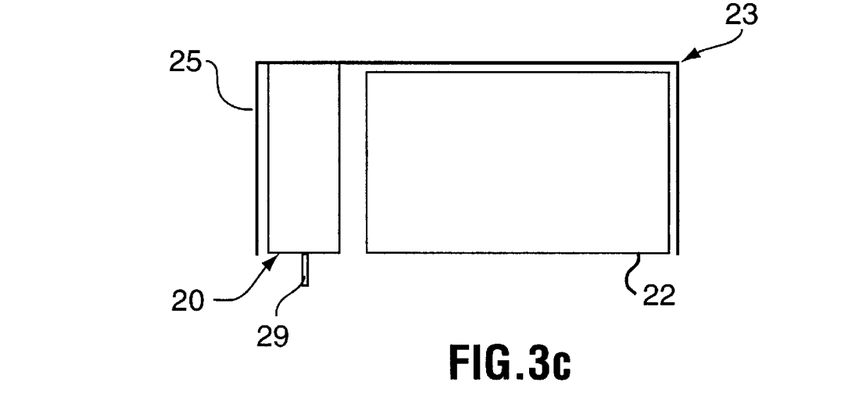

In the preferred embodiment, the equipment bay 22 is surrounded on at least three sides by a metal cabinet 23, as seen in top view in FIGS. 3a–3c. As shown in FIG. 3c and as will be described in greater detail below, the panel 20, in the closed position, also fits within cabinet 23, adjacent a side wall 25 of cabinet wall 23.

As shown in FIG. 1a, the panel 20 comprises a wall 21 from which most of the guides and spools described below extend, a wall 27, which extends at right angles from wall 21 and a handle 29, which extends outwards from wall 27.

Referring to FIG 1a, only a single fibre 32 is shown for simplicity. Spools 38, 40 to 46 and 47, as described below, extend outwardly from wall 21 of panel 20. Each spool, except for movable spool 38, is welded to wall 21. Movable spool 38 is welded to a plate 49, which will be described below. Entrance guide 34 is welded to wall 25 near a top portion of wall 25, and as with all other guides and spools, are curved to ensure a minimum curvature of fibre 32 to avoid damage to the fibre 32. The fibre 32 enters the panel 20 from the top of the panel through entrance guide 34. From entrance guide 34, the fibre 32 passes over a guide 36, which is also welded to panel wall 21. The fibre 32 then extends down to movable spool 38, around spool 38, over spool 42 and down to exit spool 46. From exit spool 46, the fibre 32 extends to fibre guide 30, which is welded to the equipment bay 22, from where the fibre 32 will be attached to an appropriate component within equipment bay 22.

Referring to FIG. 1a, spools 40–44 are vertically aligned on wall 21. Spool 38 is located to the left of spools 40–44 and below spool 44. Spool 46 is located to the right of spools 40–44 and below spool 44.

Each of the spools 38–46 has a curved portion and a wing portion. As indicated above, the curved portion extends out from the panel wall 21 (or in the case of movable spool 38, the curved portion extends from plate 49) to support the fibre 32 while ensuring a minimum curvature of the fibre. The wing portion prevents the fibre 32 from inadvertently escaping from the spool. Spool 42 will be described as a representative spool.

Figures 2A, 2B, 2C:
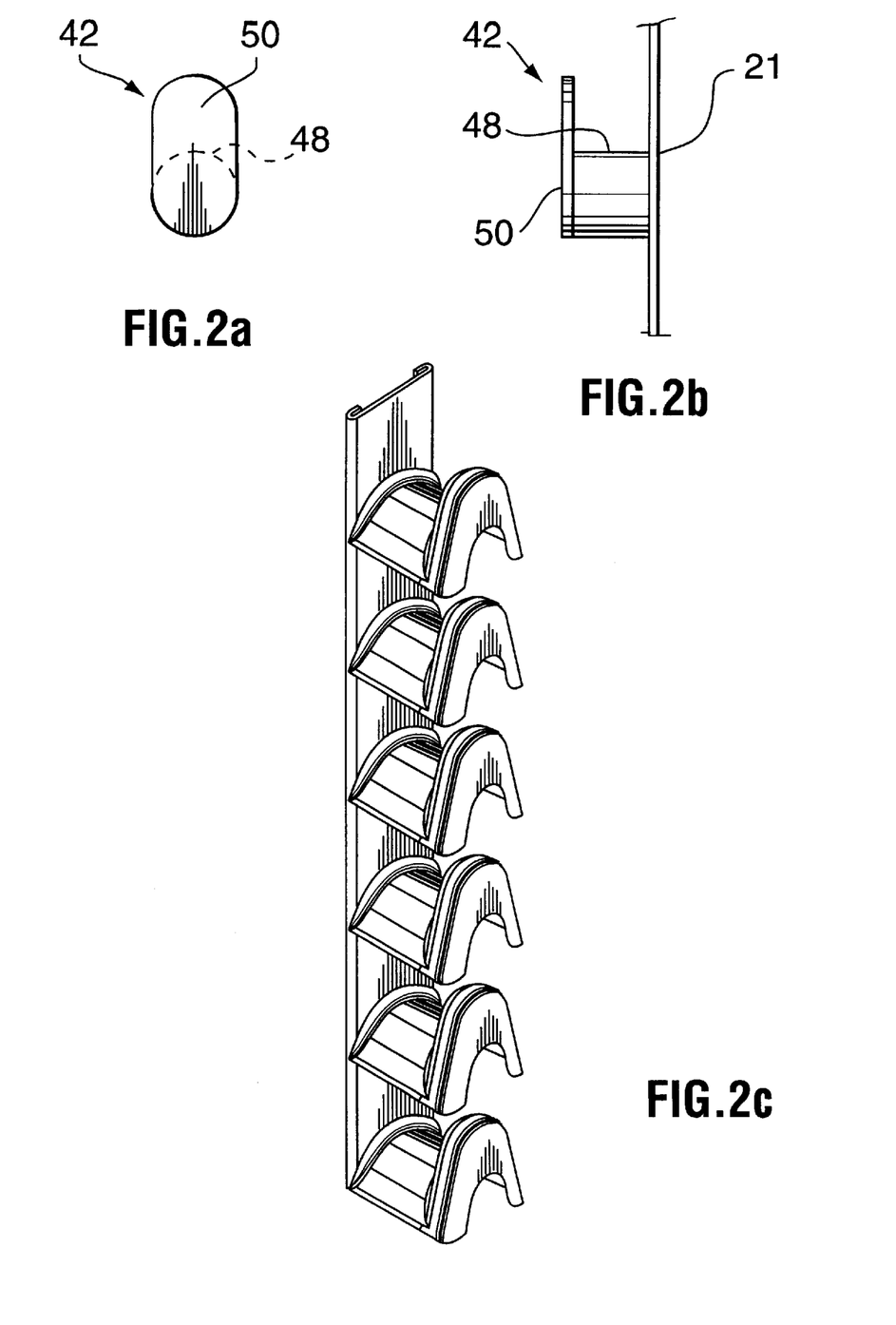

Spool 42 is shown in front view in FIG. 2a. Curved portion 48 is shown in dotted outline because, in this view, it is hidden by wing portion 50. As shown in the side view of FIG 2b, the curved portion 48 extends outwardly from panel wall 21. Wing portion 50, welded to curved portion 48, extends upwardly from an outer end of curved portion 48. In order to hold the fibre in place, the wings on the spools 40, 42 and 44 are oriented vertically, whereas the wings on spools 38 and 46 are oriented horizontally. A pawl 54, biased against a side wall 27 of panel 20, may extend from wing 52 of spool 38, to further ensure that fibre 32 does not inadvertently escape from spool 38.

Fibre cradles 62, 64, welded to wall 21 of panel 20, are positioned below spools 38, 46, respectively, to control the extent to which fibre 32 can drop within panel 20 and to ensure that the fibre 32 maintains a minimum curvature.

Of course, the exact shapes of the spools and their associated wings can differ considerably while performing the same function. As will be described in greater detail below, the number of spools can also differ, for various reasons. An example of a different shape of spool is shown in FIG. 2c, a perspective view of six vertically aligned spools. Similarly, the shapes, locations and even the number of the guides 30, 31, 32, 36 and fibre cradles 62, 64 can also differ considerably.

Figure 4A:
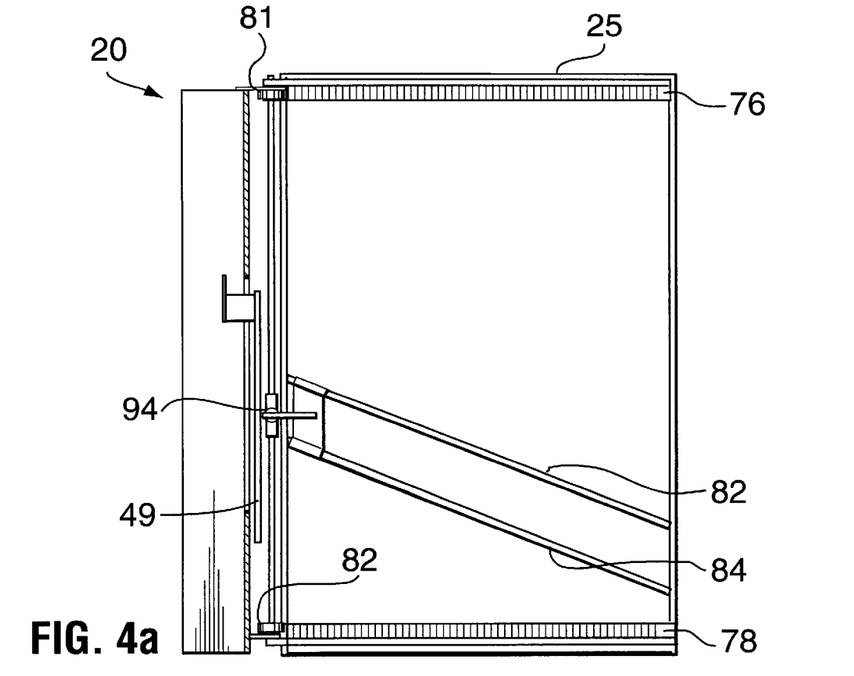
FIG. 4a is a side view of a wall of the cabinet surrounding the equipment bay, adjacent the panel in the open position.
Figure 4B:
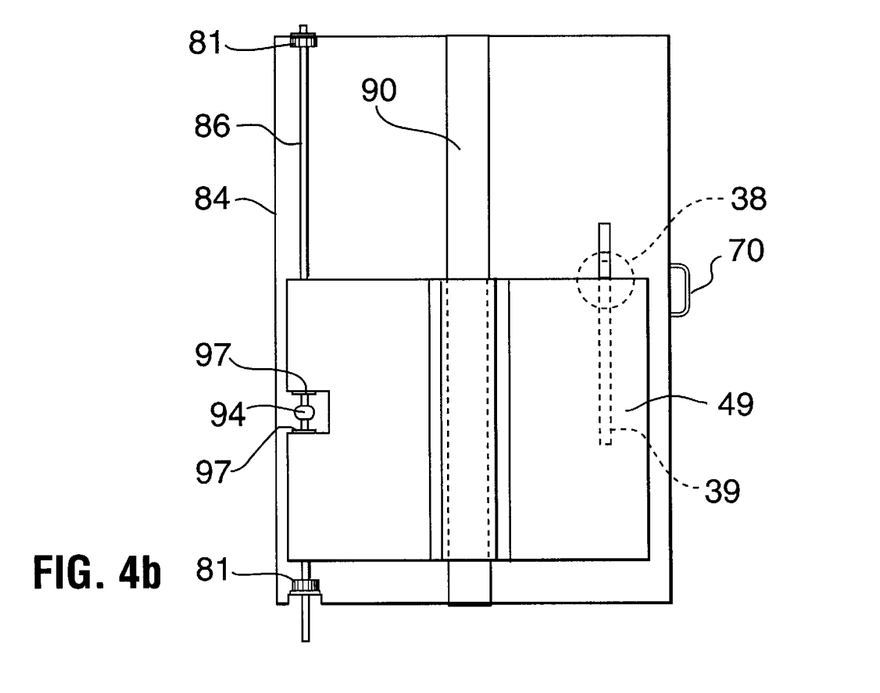
FIG. 4b is a rear view of the panel.
Figure 4C:
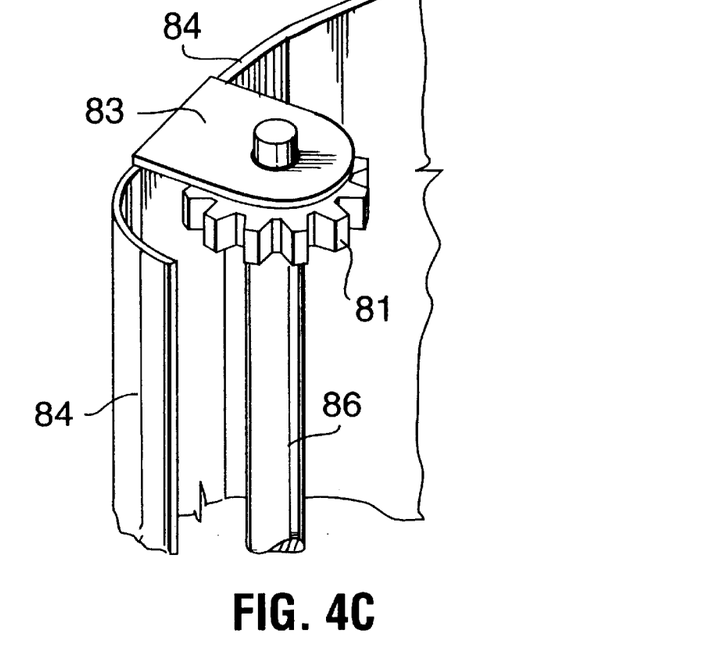
FIG. 4c is a perspective view of a top portion of the panel showing a pinion on a shaft.
Figure 4D:
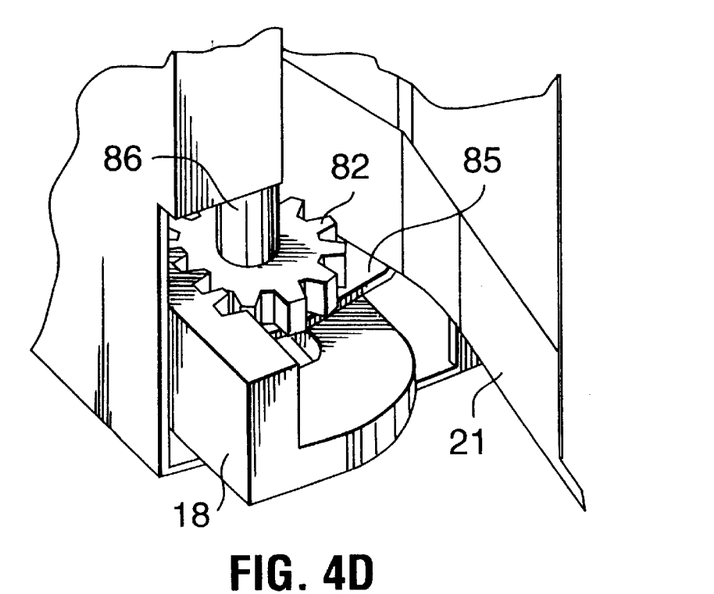
FIG. 4d is a perspective view of a bottom portion of the panel with a pinion engaged in a rack.
Figure 6A:
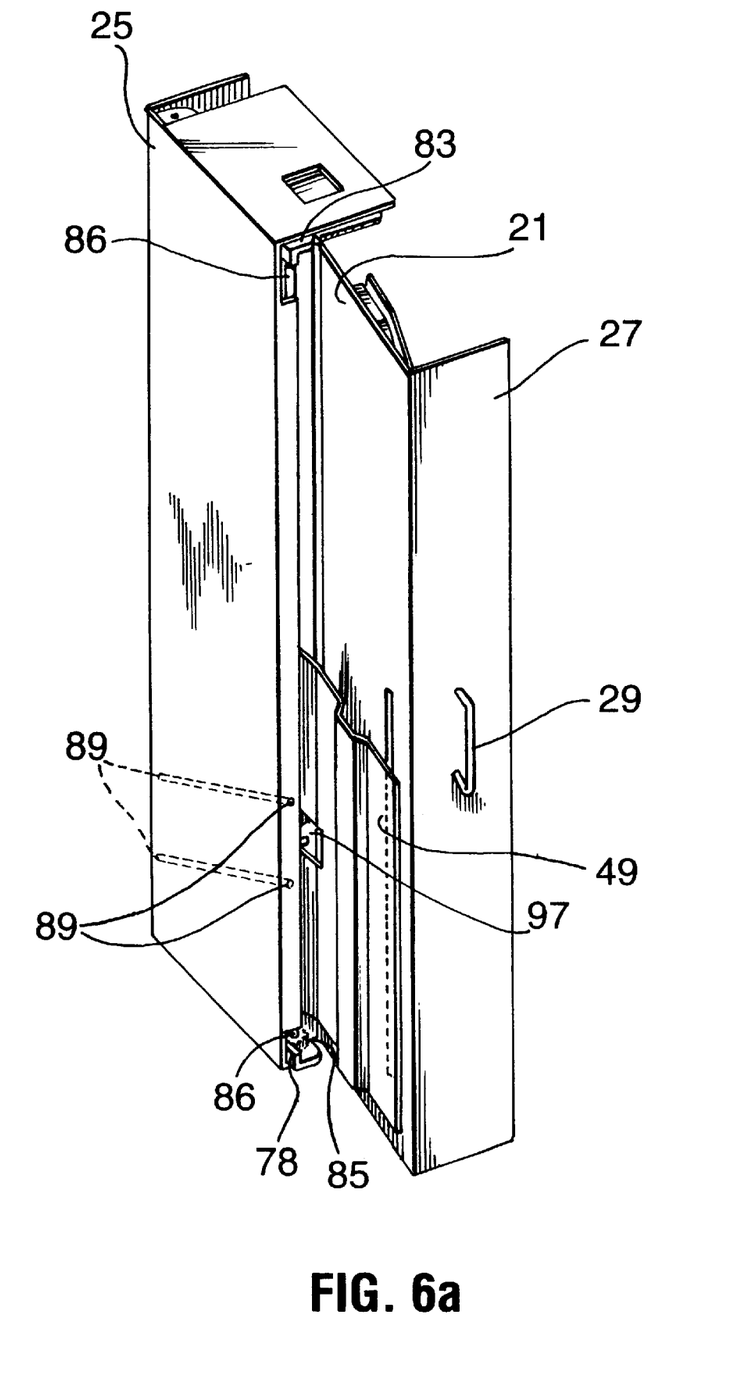
FIG. 6a is a rear perpective view of the panel in the mid-way open position.
Figure 6B:
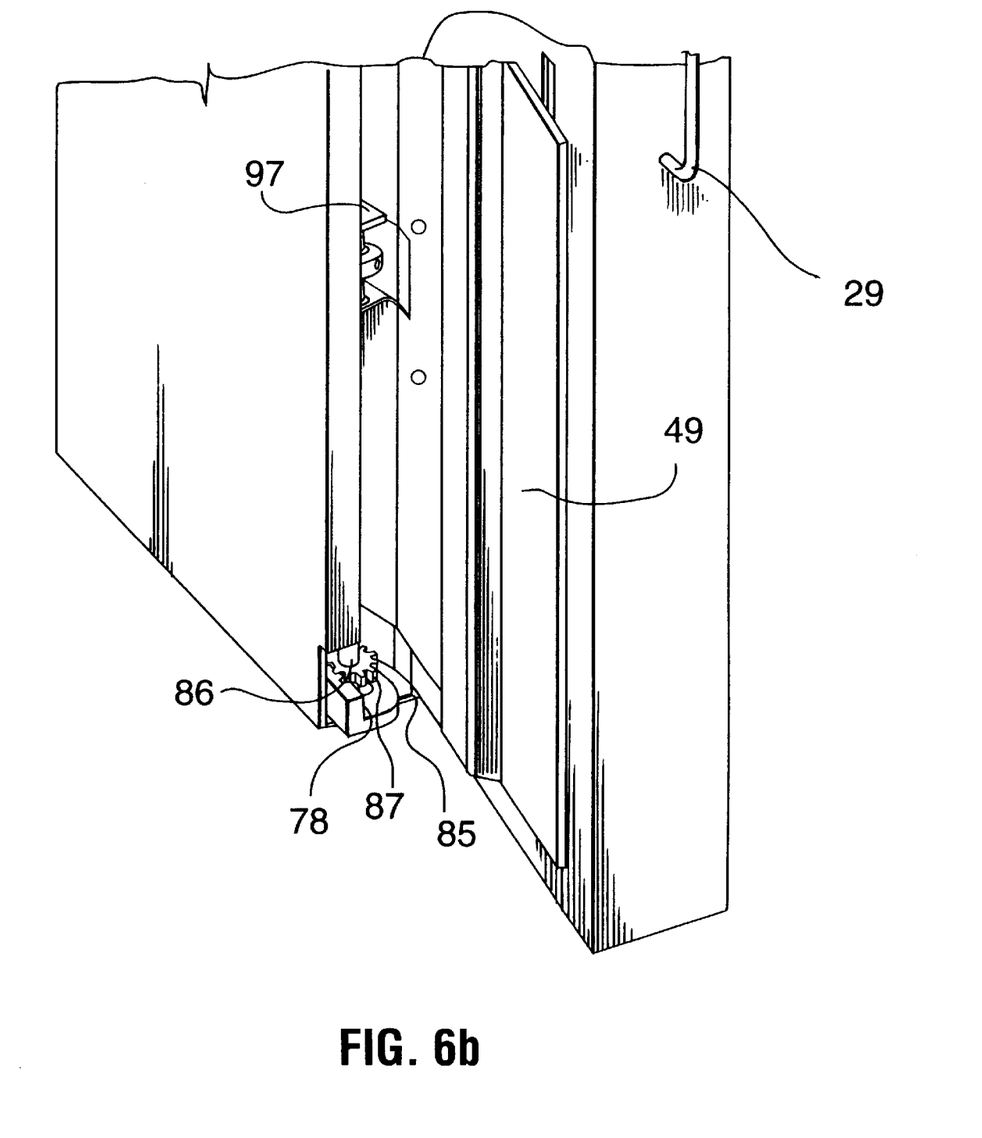

In the preferred embodiment, wall 25 of cabinet 23, as shown in side view in FIG. 4a, has two racks 76, 78. As shown in FIGS. 4a, 4b and 4c, two pinions 81, 82 are mounted on a shaft 86 which shaft is rotatably secured to panel 20 within shaft supports 83, 85 (the upper shaft support 83 is shown in FIG. 4c and the lower shaft support 85 is shown in FIG. 4d). Shaft supports 83, 85 are welded to wall 21 at or near a rear end 84 of wall 21 of panel 20, as shown in FIGS. 4c, 6a and 6b. Panel 20 is movable along wall 25 by rack and pinion engagement of racks 76, 78 with pinions 81, 82.

Figure 4E:
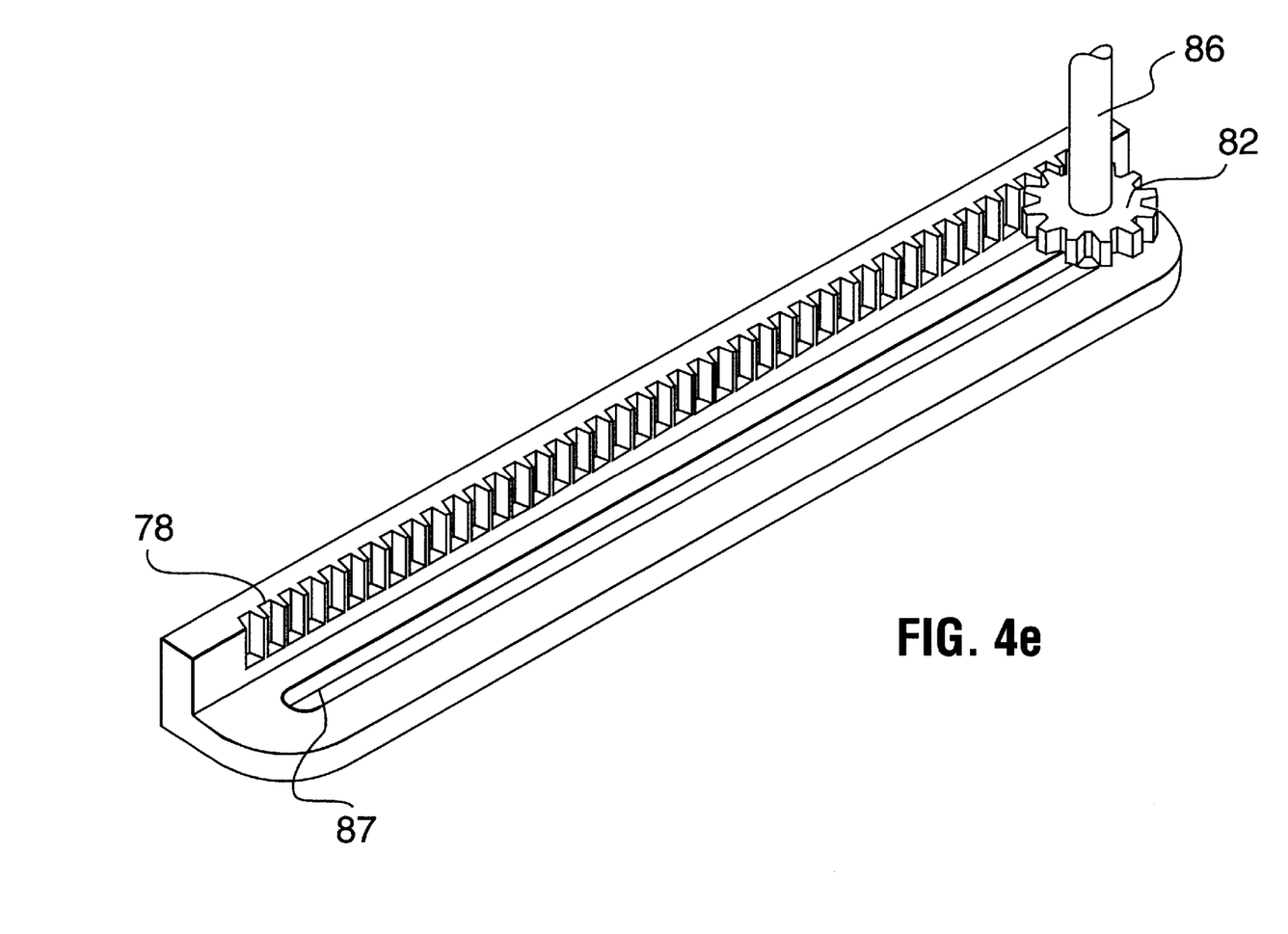
FIG. 4e is a perspective view of the pinion on the shaft engaged with a rack, with the panel and cabinet not shown.

In the preferred embodiment, and as shown in perspective view in FIG. 4e (FIG. 4e shows the shaft 86 and pinion 82 without the shaft support 85, panel 20 or cabinet 23), adjacent and perpendicular to each rack 78 is a track or indentation 87 in which an end of shaft 86 travels and is guided as the pinions 82 move along racks 78. Similarly, the other end of shaft 86 travels and is guided by an indentation (not shown) adjacent and perpendicular to rack 76. Also in the preferred embodiment, and as shown with respect to the lower rack 78 in FIG. 4e, each indentation 87 is the same length as its corresponding rack. Accordingly, the ends of the rack 78 and the indentation 87 determine the extent to which the panel 20 can be pushed in or pulled out beside wall 25.

As noted above, movable spool 38 is not directly attached to wall 21 of panel 20. As can be seen in FIG. 1a, movable spool 38 is vertically movable along a slot 39, which slot is formed within wall 21. Movable spool 38 is attached, preferably by welding, to a plate 49, which plate is located on the rear surface of wall 21 of panel 20, as shown in FIG. 4b. The plate 49 is movable vertically along the rear surface of wall 21 through a tongue and groove relationship. FIG. 4b shows tongue 90 of wall 21, and groove 91 of plate 49 is shown in FIG. 5c.

Figure 5A:
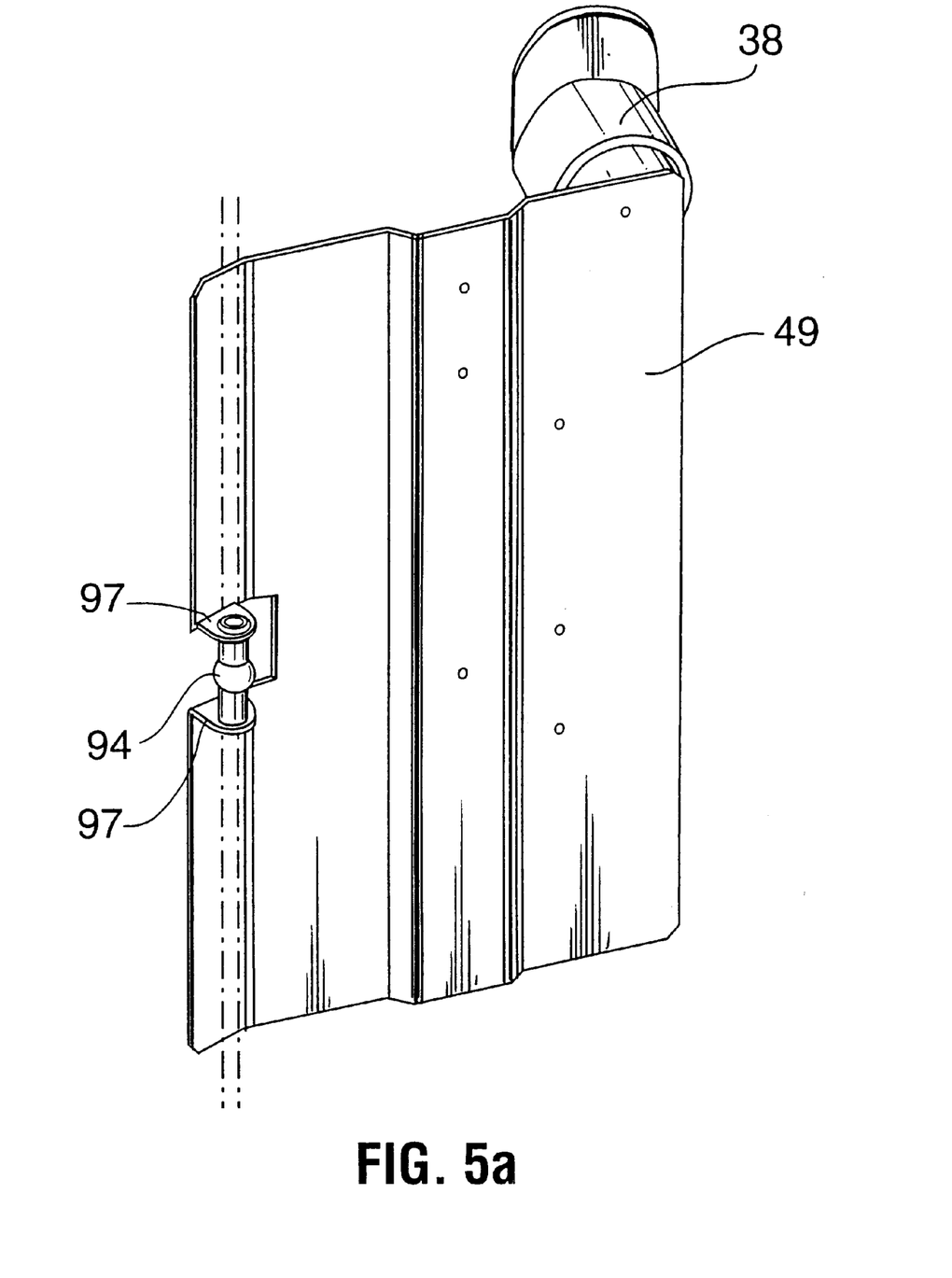
FIG 5a is a rear, perspective view of the plate attached to the movable spool.

As shown in FIG. 4a, an inclined track is created beside wall 25 of cabinet 23, by two rods 82, 84, whose ends are preferably bent to intersect wall 25 at 90 degrees and are connected to wall 25 by screws 89 engaged through the hollow ends of rods 82, 84, as shown in FIG. 6a. The plate 49 is indirectly connected to rods 82, 84 through a hollow ball joint 94. As shown in FIGS. 4b and 5a, a rear view of the wall 21 and a rear perspective view of plate 49, respectively, ball joint 94 is welded at its ends to ball joint supports 97 which are in turn welded to plate 49. As suggested in FIGS. 6a and 6b, the shaft 86 runs through the hollow ball joint 94.

Figure 5B:
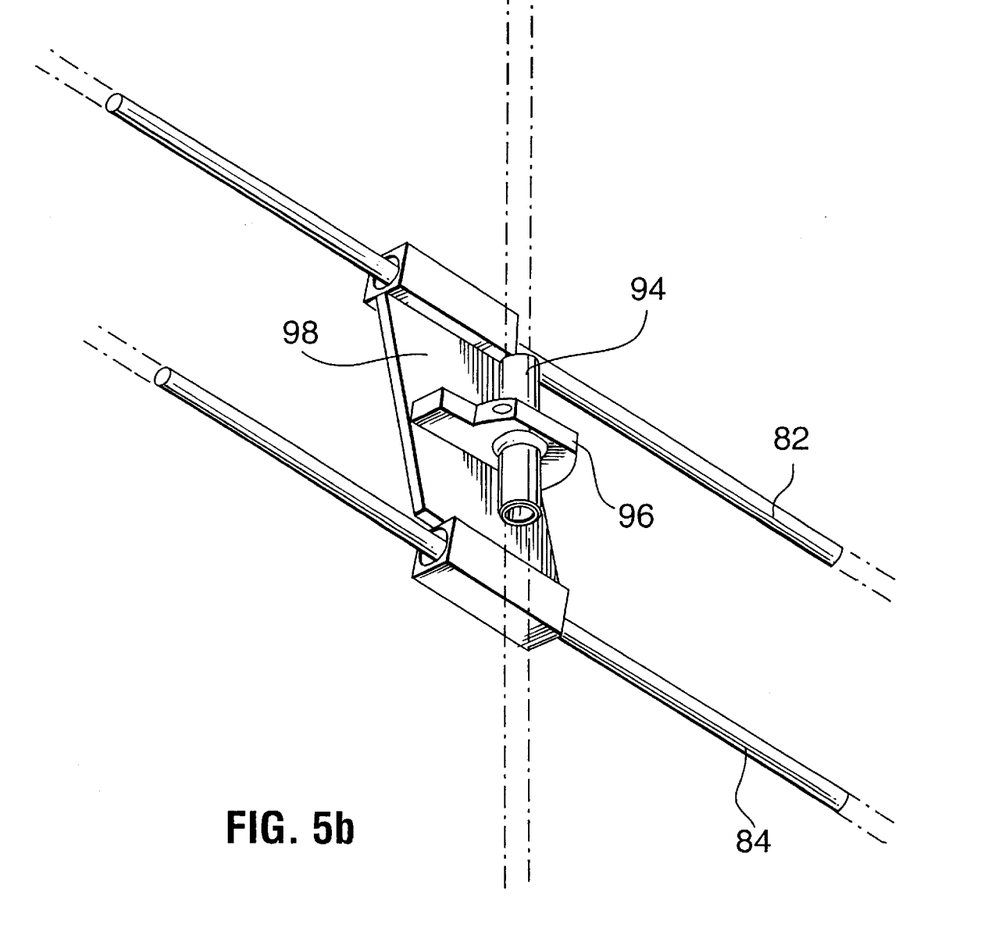
FIG. 5b is a perspective view of a sliding unit engaged on inclined track rods.

As shown in FIG. 5b, the ball portion of ball joint 94 is housed within housing 96. Housing 96 is attached with screws to sliding unit 98. Sliding unit 98 comprises a flat surface having one bore at each end. Rod 82 fits through one bore of sliding unit 98 and rod 84 fits through the other bore of sliding unit 98. Accordingly, sliding unit 98 is slidably connected to rods 82, 84. Thomson linear bearings may be used within the bores to help the sliding unit 98 slide along rods 82, 84.

Figure 5C:
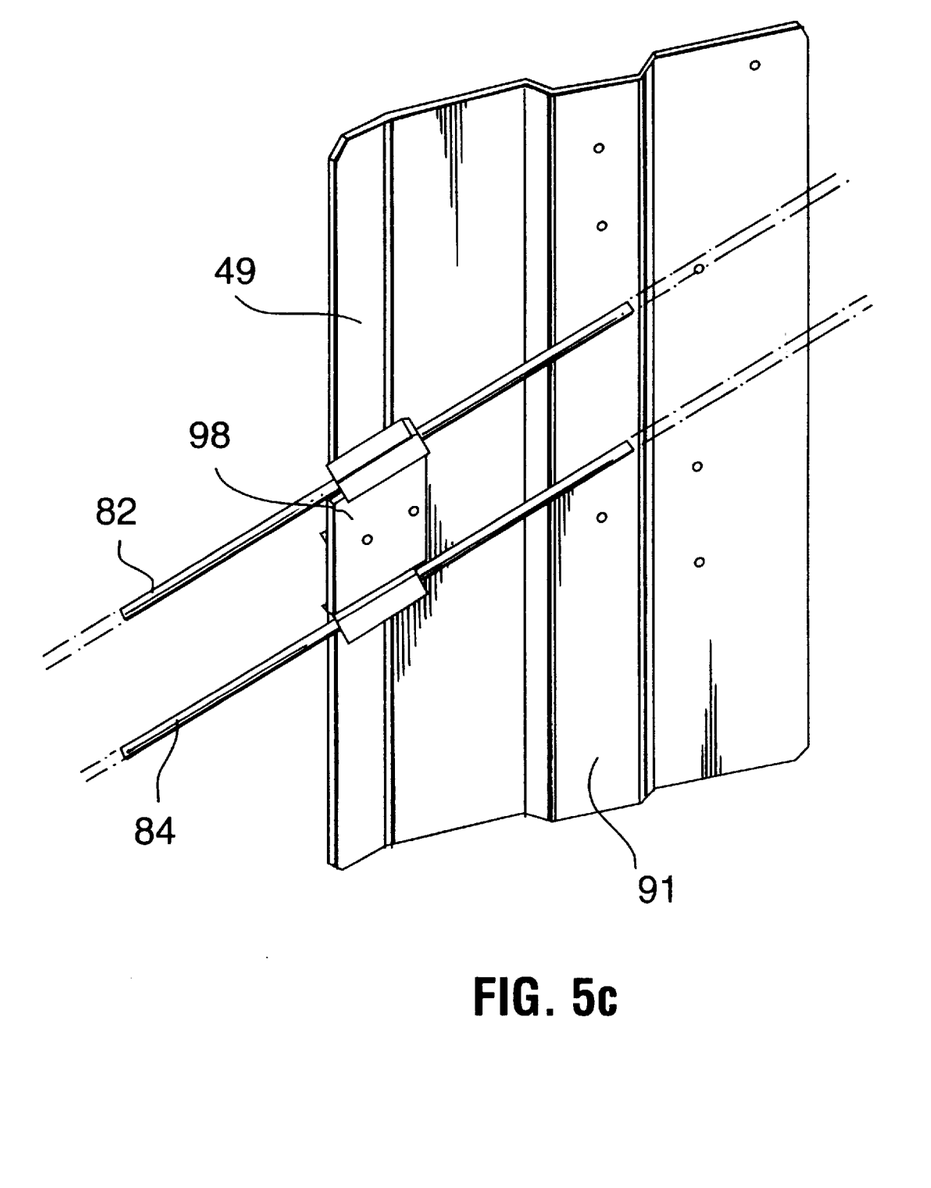
FIG. 5c is a view similar to the view of FIG. 5a in which the ball joint is engaged with the sliding unit and inclined track rods.
Figure 5D:
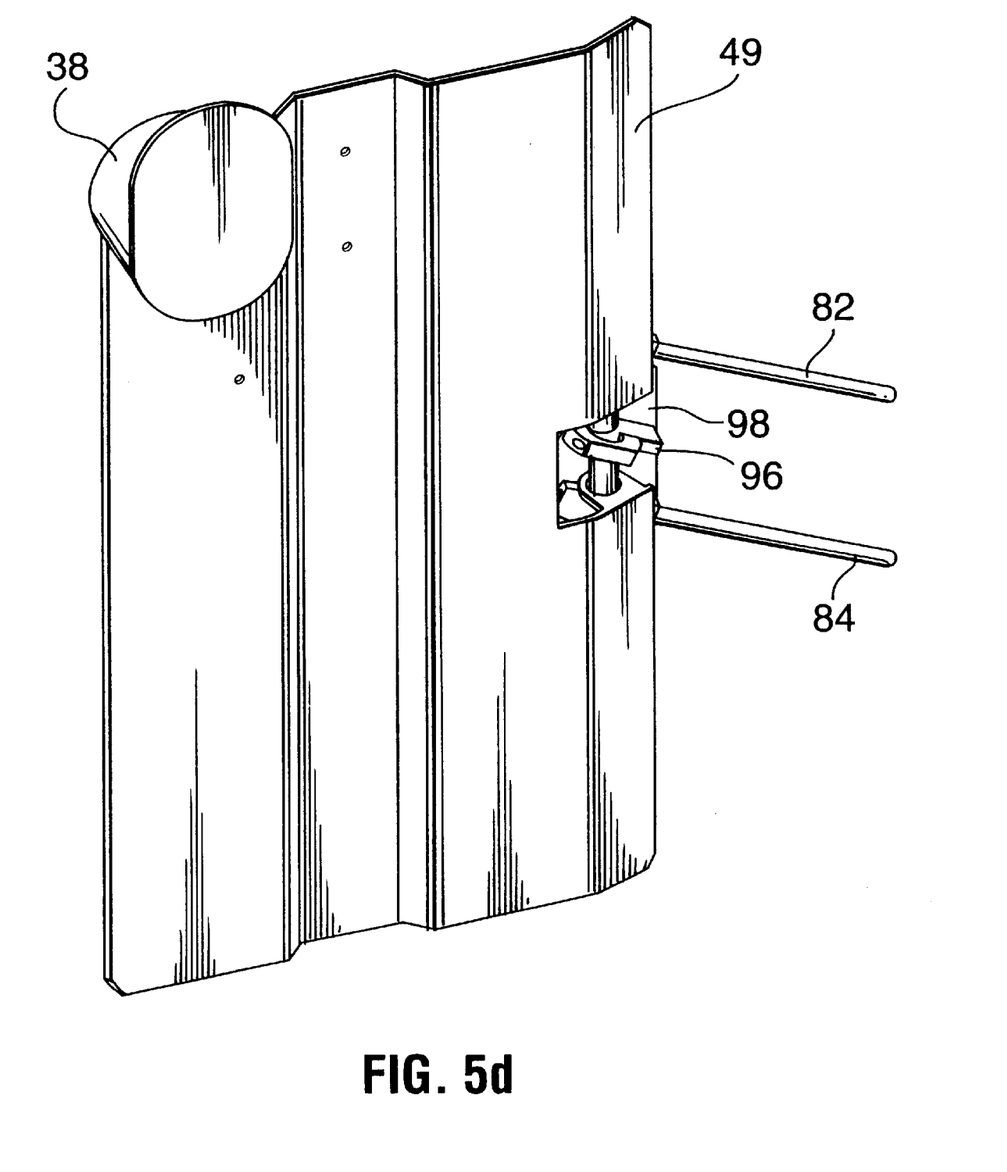
FIG. 5d is a front, perspective view of the plate and movable spool shown engaged to the sliding unit and inclined track rods.

FIG. 5c shows a rear view of plate 49 attached to sliding unit 98. (Wall 25 of cabinet 23, to which the rods 82, 84 are connected, is not shown in FIGS. 5b–5d.) FIG. 5d shows a front perspective view of plate 49 attached to sliding unit 98. An opening within plate 49 accommodates the ball joint 94 and housing 96.

The use of the panel 20 is described as follows. As indicated above, FIG. 1a shows panel 20 in the open position. If there is limited space around the panel 20 and equipment bay 22, panel 20 will usually remain in a closed position, until repositioning or maintenance of the fibres is required. FIGS. 3a–3c show top views of the panel 20 adjacent the equipment bay 22, with the panel 20 in the open position, mid-way open position, and closed position, respectively. The panel 20 may be opened or closed by holding onto the handle 29 and pushing or pulling as appropriate. From the open position shown in FIGS. 1 and 3a, the panel 20 is closed by first rotating the panel 90 degrees (to the mid-way open position of FIGS. 3b and 6a) towards equipment bay 22. This rotation is accomplished by the rotation of shaft supports 83 around the ends of shaft 86. To close the panel 20, the panel is then pushed until it reaches the closed position shown in FIG. 3c.

Movement of the panel 20 from the open to the closed position (or vice versa) may be accomplished by the rack and pinion mechanism, as described above, although many other techniques may be employed to accomplish the same result.

It should be noted that the distance from exit spool 46 to fibre guides 30 and 31 is approximately the same when the panel is in the open or closed positions. Accordingly, the amount of slack of fibre 32 in the panel 20 is not significantly affected as a result of any change in distance between the exit spool 46 and fibre guides 30 and 31 as the panel is moved. However, because the fibre 32 enters panel 20 from fibre guides 34 located near the forward end of wall 25, the distance from fibre guide 34 to movable spool 38 is greater when the panel 20 is in the open position than when the panel 20 is in the closed position. Accordingly, if movable spool 38 were fixed relative to the panel 20, as the panel 20 is moved from the open to closed positions, the amount of slack in the fibre 32 would increase substantially as the panel is moved to the closed position, possibly creating tangles among the fibres or allowing sufficient slack for the fibre 32 to extend beyond the wings of spool 38. Accordingly, to compensate for the extra slack that would be produced as the panel 20 is moved from the open to the closed position, spool 38 moves downwards in slot 39, as will be described in detail below. Similarly, as the panel is moved from the closed to the open position, spool 38 moved upwards in slot 39. Preferably, the amount of slack in fibre 32 remains relatively constant at all positions of the panel 20. As the panel 20 moves from the mid-way open position shown in FIG. 3b to the open position of FIG. 3a, the distance from fibre guide 34 to movable spool 38 remains essentially the same (the fibre guide 34 is approximately at the centre of a circle, with the fibre guide 34 at the circumference) as the panel is moved and accordingly, movable spool 38 does not move within slot 39. However, as the panel 20 moves from the mid-way open position to the closed position, the movable spool 38 moves downwards in slot 39, as described above.

When the panel 20 moves from the mid-way open position of FIG. 3b to the closed position of FIG. 3c, the sliding unit 98 and hence the housing 96 and the ball joint 94 move downwards along rods 82, 84, causing the plate 49 attached to ball joint 94 to move downwards. Accordingly, the movable spool 38 attached to plate 49 moves downwards, as well. Of course, when the panel 20 moves from the closed to the mid-way open position, the sliding unit 98, the housing 96, the ball joint 94, the plate 49 and the movable spool 38 move upwards.

The degree to which rods 82, 84 are angled depends upon the amount of slack that would be produced as the panel 20 moves from the mid-way open position to the closed position if there were no movable spool 38. The amount of slack that would be produced is dependent upon the location of the fibre 32 as it enters panel 20, the placement of movable spool 38 and the distance the panel is moved from the mid-way open position to the closed position. The angle of the rods 82, 84 can be determined by simple calculation or by trial and error.

Figure 1B:
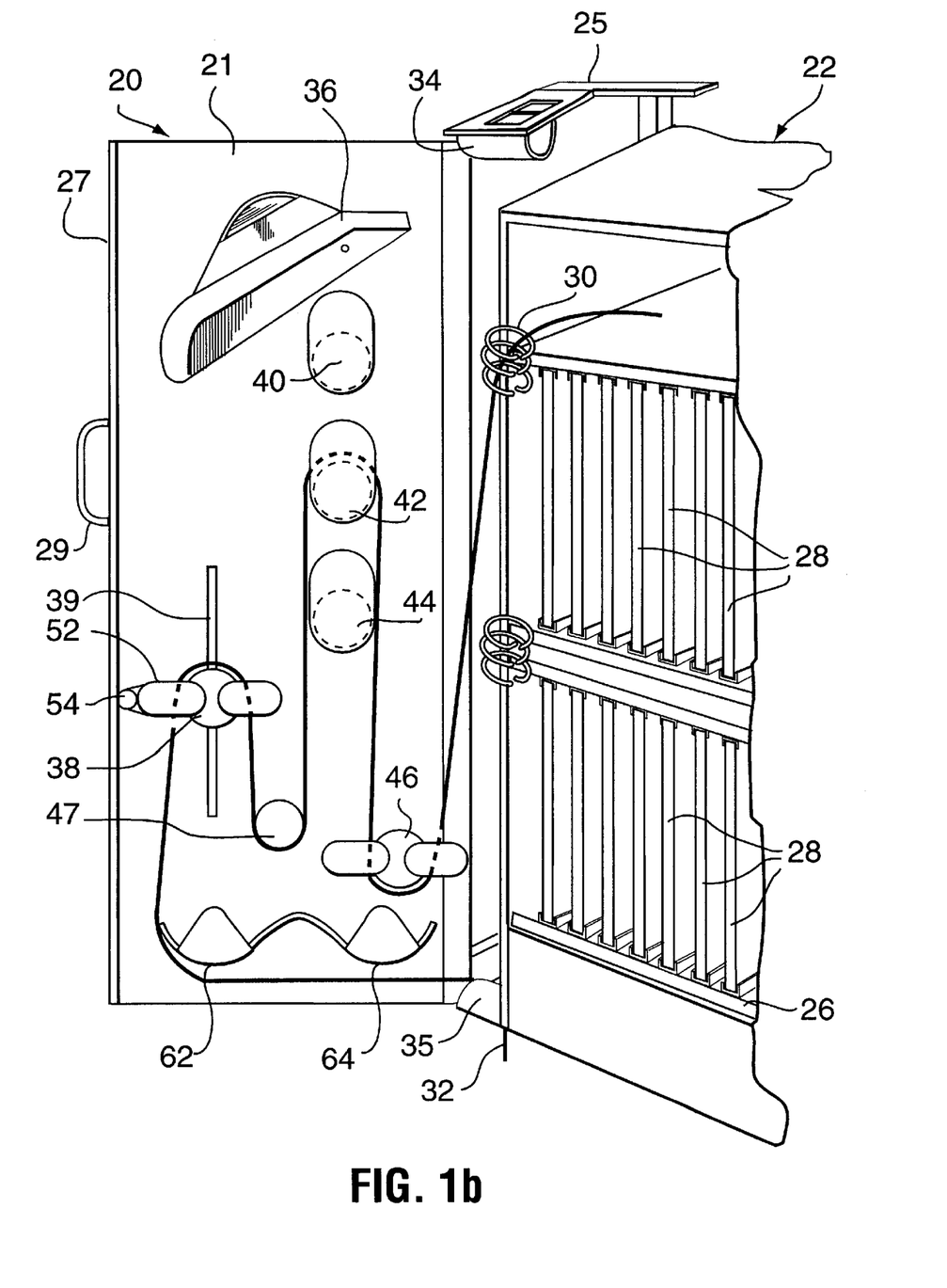
FIG. 1b is a similar view to FIG. 1a except that, according to another embodiment of the invention, the fibre enters the panel from below.

Another embodiment of the invention is shown in FIG. 1b, which is a similar view to FIG 1a except that the fibre 32, instead of being fed into the panel 20 from above, is fed into panel 20 from below. In this embodiment, there is no need for fibre guide 36 but there is a need for spool 47, which is located below movable spool 38. As shown in FIG. 1b, fibre 32 is introduced into panel 20 from below, across fibre guide 35. Fibre 32 extends underneath fibre cradles 62 and 64, over movable spool 38, under spool 47 and then in this example, over spool 42 and then exits panel 20 as described above with respect to FIG 1a. The movement of the movable spool is the opposite as described above with respect to FIG. 1a. In other words, as the panel 20 moves from the closed to the mid-way open position, spool 38 would have to move downwards. Accordingly, rods 82, 84 would have to be angled from a higher position to a lower position looking from right to left in FIG. 4a.

Figure 1C:
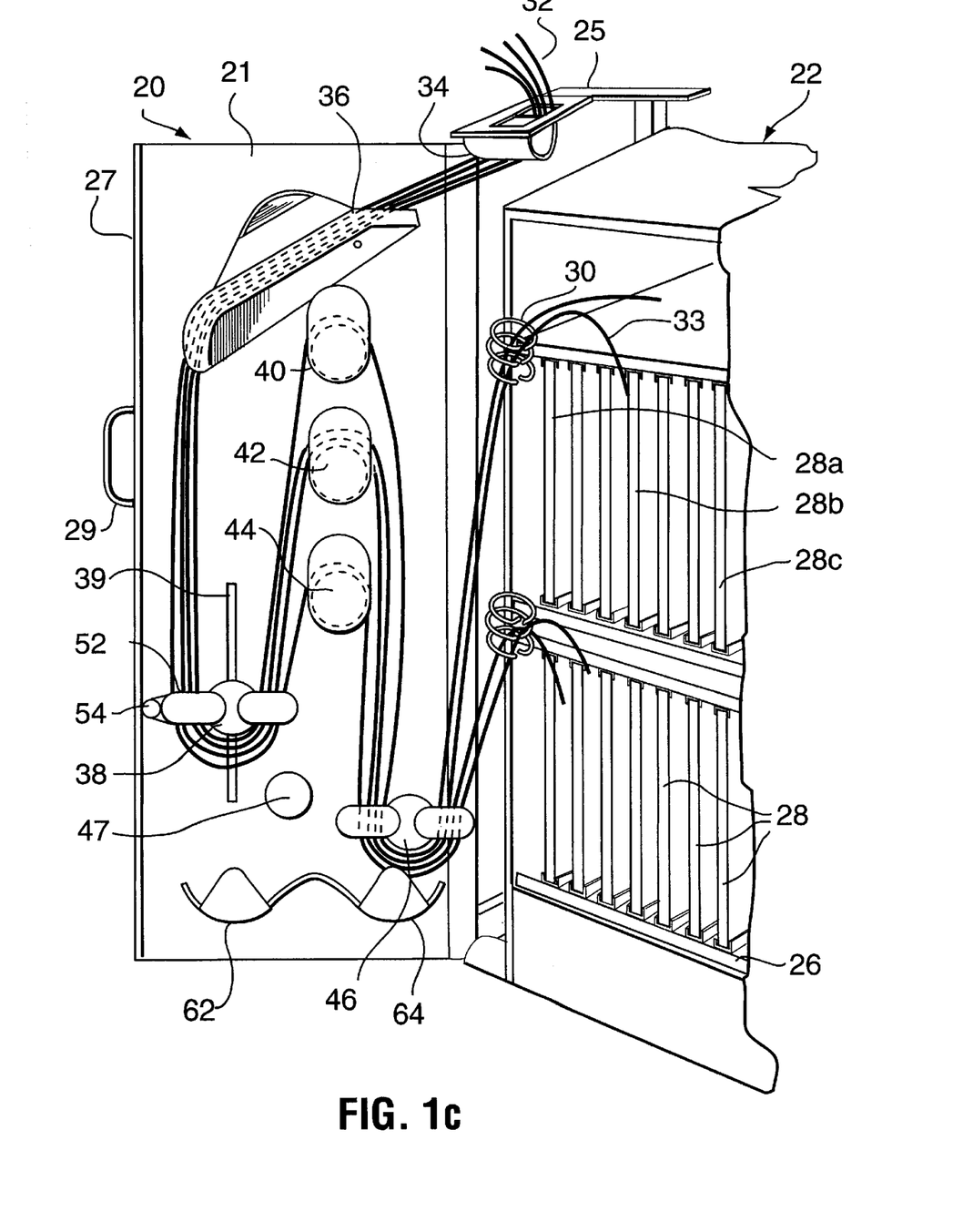
FIG. 1c is a view similar to FIG. 1a except that FIG. 1c shows four fibres.

The embodiments of the invention shown in FIGS. 1a and 1b only show a single fibre 32. Of course, any number of fibres could be used. For example, FIG. 1c is a view similar to FIG. 1a except that FIG. 1c shows four fibres. Each fibre is placed on one of spools 40, 42 or 44 to achieve a desired amount of slack. For example, in FIG. 1c, fibre 33 is attached to electrical component 28b. If fibre 33 were to be rerouted to electrical component 28c for example (which is further away from panel 20 than component 28b), there would be less slack in fibre 33 and so fibre 33 would likely be manually removed from spool 42 and placed on spool 44 to produce approximately the same amount of slack as before. Similarly, if fibre 33 is rerouted from component 28b to component 28a, fibre 33 would likely be moved from spool 42 to spool 40 to produce approximately the same amount of slack as before.

It should be noted that the invention will function with or without gravity, and in any orientation. In other words, this invention will function in the same manner if in space, for example. However, depending upon the orientation or the lack of gravity, elastomer or spring-like retainers (not shown) can be used to support the fibre around the spools and around the locations where the fibre enters and exits the panel 20.

If the panel is moved too quickly, the fibres may be adversely affected. An air shock device (which devices are well known to those skilled in the art) may be attached to the panel 20 to control the rate at which the panel 20 can be pulled or pushed.

Although the above-noted embodiments describe and illustrate three vertically aligned spools 40, 42, 44 any number of vertically aligned spools may be used depending upon the height of panel 20 (and the gauge of the fibre).

As well, although the above description only refers to the management of fibres, the device would also effectively manage other material with similar characteristics (eg, wire, string, yarn, etc.).

Numerous modifications and variations of the present invention are possible in light of the above teachings. It is therefore to be understood that within the scope of the appended claims, the invention may be practised otherwise than as specifically described herein.

I claim:

1. A panel for managing fibres to be routed to an equipment bay, the panel being arranged to slide parallel to an end of the equipment bay between a closed position in which the panel is adjacent to the end of the equipment bay, allowing limited or no access to the fibres, and an open position in which the panel is displaced from the end of the equipment bay, allowing access to the fibres, wherein the panel is provided with spools for supporting the fibres and fibre guides for guiding the fibres, one of the spools being a movable spool which moves vertically in one direction as the panel moves from the closed position to the open position and moves vertically in the other direction as the panel moves from the open position to the closed position, thereby maintaining approximately a constant amount of slack in the fibres as the panel moves from the open position to the closed position or from the closed position to the open position.

2. The panel of claim 1 wherein, a wall parallel and adjacent to the panel when the panel is in the closed position comprises track means and the panel further comprises pinion means rotatably connected to a rear surface of the panel wherein the panel is slidable from the open position to the closed position or from the closed position to the open position by rack and pinion engagement of the pinions with the racks.

3. The panel of claim 2 wherein the wall is one wall of a cabinet having three walls, wherein the cabinet, when the panel is in the closed position, surrounds the combination of the panel and the equipment bay on three sides.

4. The panel of claim 2 wherein, from the open position, the panel is rotatable approximately 90 degrees away from the equipment bay.

5. The panel of claim 4 wherein the panel further comprises a plate, vertically movable along a rear surface of the panel, the plate being connected on one side to the movable spool and connected on another side to an inclined track means connected to the said wall, wherein as the panel moves from the closed position to the open position, the plate is forced vertically in one direction along the inclined track means and when the panel moves from the open position to the closed position, the plated is forced vertically in the other direction along the inclined track means.

6. The panel of claim 5 wherein the fibres are routed from an entrance point above the panel, along a fibre guide, under the movable spool, over one of a series of vertically aligned spools, under an exit spool and out of the panel towards the equipment bay.

7. The panel of claim 6 wherein the distance from the exit spool to a fibre guide at the equipment bay is approximately the same when the panel in the closed position and when the panel is in the open position.

8. The panel of claim 5 wherein the fibres are routed from an entrance point below the panel, along a fibre guide, over the movable spool, under a spool located below the movable spool, over one of a series of vertically aligned spools, under an exit spool and out of the panel towards the equipment bay.

9. The panel of claim 8 wherein the distance from the exit spool to a fibre guide at the equipment bay is approximately the same when the panel is in the closed position and when the panel is in the open position.

10. An equipment bay having an end from which optical or electrical fibres are routed to the equipment bay, the equipment bay being provided with a panel for managing the fibres, the panel having a closed position in which the panel is adjacent the end of the equipment bay allowing limited or no access to the fibres, and an open position in which the panel is displaced from the end of the equipment bay, allowing access to the fibres, wherein the panel is provided with spools for supporting the fibres and fibre guides for guiding the fibres, one of the spools being a movable spool which moves vertically in one direction as the panel moves from the closed position to the open position and moves vertically in the other direction as the panel moves from the open position to the closed position, thereby maintaining approximately a constant amount of slack in the fibres as the panel moves from the open position to the closed position or from the closed position to the open position.

11. The equipment bay of claim 10 wherein, a wall parallel and adjacent to the panel when the panel is in the closed position comprises track means and the panel further comprises pinion means rotatably connected to a rear surface of the panel wherein the panel is slidable from the open position to the closed position or from the closed position to the open position by rack and pinion engagement of the pinions with the racks.

12. The equipment bay of claim 11 wherein the wall is one wall of a cabinet having three walls, wherein the cabinet, when the panel is in the closed position, surrounds the equipment bay on three sides.

13. The equipment bay of claim 11 wherein, from the open position, the panel is rotatable approximately 90 degrees away from the end of the equipment bay.

14. The equipment bay of claim 13 wherein the panel further comprises a plate, vertically movable along a rear surface of the panel, the plate being connected on one side to the movable spool and connected on another side to an inclined track means connected to the said wall, wherein as the panel moves from the closed position to the open position, the plate is forced vertically in one direction along the inclined track means and when the panel moves from the open position to the closed position, the plated is forced vertically in the other direction along the inclined track means.

15. The equipment bay of claim 14 wherein the fibres are routed from an entrance point above the panel, along a fibre guide, under the movable spool, over one of a series of vertically aligned spools, under an exit spool and out of the panel towards the end of the equipment bay.

16. The equipment bay of claim 15 wherein the distance from the exit spool to a fibre guide located at the end of the equipment bay is approximately the same when the panel in the closed position and when the panel is in the open position.

17. The equipment bay of claim 14 wherein the fibres are routed from an entrance point below the panel, along a fibre guide, over the movable spool, under a spool located below the movable spool, over one of a series of vertically aligned spools, under an exit spool and out of the panel towards the end of the equipment bay.

18. The equipment bay of claim 17 wherein the distance from the exit spool to a fibre guide at the end of the equipment bay is approximately the same when the panel is in the closed position and when the panel is in the open position.

* * * * *